United States Patent [19]

Miller et al.

[11] Patent Number: 4,516,785
[45] Date of Patent: May 14, 1985

[54] PISTON WITH A CONTROLLED EXPANSION PISTON ANTI-EXTRUSION RING

[75] Inventors: John E. Miller, Dallas; Dennis J. Fortino, Plano, both of Tex.

[73] Assignee: Chromium Corporation, Richardson, Tex.

[21] Appl. No.: 448,430

[22] Filed: Dec. 10, 1982

[51] Int. Cl.³ .............................................. F16J 15/18
[52] U.S. Cl. ................................. 277/188 A; 277/221
[58] Field of Search .................... 277/188 A, 221, 193

[56] References Cited

U.S. PATENT DOCUMENTS

| | | | |
|---|---|---|---|
| 1,181,618 | 5/1916 | Smith | 277/221 |
| 1,767,498 | 6/1930 | Young | 277/193 |
| 2,317,122 | 4/1943 | Volpin . | |
| 2,519,144 | 8/1950 | MacClatchie . | |
| 2,576,025 | 11/1951 | MacClatchie . | |
| 2,677,581 | 5/1954 | Taylor, Jr. . | |
| 2,748,718 | 6/1956 | MacClatchie . | |
| 2,765,204 | 10/1956 | Josephson | 277/188 A |
| 2,808,301 | 10/1957 | Bowerman . | |
| 2,926,976 | 3/1960 | Bowerman et al. . | |
| 2,973,978 | 3/1961 | Oppenheim | 277/188 A |
| 3,521,893 | 7/1970 | Josephson . | |
| 3,719,366 | 3/1973 | Pippert . | |
| 3,901,517 | 8/1975 | Heathcott . | |
| 4,143,586 | 3/1979 | Zitting . | |
| 4,219,204 | 8/1980 | Pippert . | |
| 4,281,590 | 8/1981 | Weaver . | |
| 4,310,163 | 1/1982 | Pippert | 277/188 A |
| 4,379,558 | 4/1983 | Pippert | 277/188 A |
| 4,436,316 | 3/1984 | Karr | 277/188 A |

OTHER PUBLICATIONS

Edwin C. Lewis II, "Mud Pump Failure Analysis Part 4—Extrusion, The Primary Cause of Piston Failure", *Petroleum Engineer International*, Oct., 1981.

*Primary Examiner*—Robert I. Smith
*Attorney, Agent, or Firm*—Brumbaugh, Graves, Donohue & Raymond

[57] ABSTRACT

In a pump for pumping fluid having a piston with a flange, a cylinder, a gap between the cylinder and the flange, and a sealing device, an improved sealing device has an anti-extrusion ring located at a face of the sealing device opposite the fluid. The anti-extrusion ring is bonded to the sealing device and is biased to be in intimate, movable contact with the cylinder. The anti-extrusion ring is made from a material having a modulus of elasticity sufficient so that it does not extrude into the gap under the influence of the hydrostatic pressure generated during pump operation. The sealing device, or a portion thereof, has a modulus of elasticity sufficient to control the radially outward expansion of the anti-extrusion ring so that the sides of the ring do not press too tightly against and cause excessive wear of the cylinder. The anti-extrusion ring has at least one split in it, and a ring having a number of tangential-cut splits or step-cut splits could be used.

7 Claims, 6 Drawing Figures

PISTON WITH A CONTROLLED EXPANSION PISTON ANTI-EXTRUSION RING

BACKGROUND OF THE INVENTION

1. Field of the Invention

The invention relates generally to sealing devices for reciprocating pumps. More particularly, the invention relates to a sealing device with an anti-extrusion ring that reduces the extrusion of an elastomeric sealing section of the device through the gap between the piston flange and the pump cylinder by controlling the expansion of the anti-extrusion ring, even after the flange and the cylinder are worn. The invention is particularly applicable to pumps in abrasive services, such as pumping the drilling mud in oil fields at pressures of up to 4,000 psi or higher.

2. Description of the Prior Art

In the oil well drilling art, an oil well being drilled is constantly flooded with a mud or clay slurry which is pumped at pressures up to 4,000 psi. These pumps are commonly reciprocating pumps in which a flanged piston moves within a cylinder. To permit reciprocation, the flange of the piston is typically slightly smaller in diameter than the cylinder. The gap between the flange and the cylinder wall is sealed by an elastomeric seal which is designed for easy replacement because of the wear which it suffers in use.

Elastomeric seals function by substantially sealing against the piston liner so that there is only a very minute leakage of the working fluid through the seal in response to the hydrostatic pressure of the contained fluid. Because under pressure the elastomeric seal actually behaves more like a fluid, the hydrostatic pressure transmitted through it causes the sealing material to extrude into the gap between the cylinder liner and the piston flange, at which point most of the sealing action occurs. However, as the piston reciprocates, the elastomeric material in the gap wears and erodes. This wearing and breaking off occur until the seal is no longer able to seal the fluid in the cylinder, at which time the seal must be replaced. Extrusion of elastomeric seals in mud pumps is discussed in detail in an article in *Petroleum Engineer International*, October, 1981, entitled "Mud Pump Failure Analysis, Part 4—Extrusion, The Primary Cause of Piston Failure."

Several devices have been proposed that would lessen extrusion and, consequently, wear of an elastomeric sealing section of a sealing device in a reciprocating pump, such as a mud pump. A common expedient is to include fabric or similar reinforcement in the heel section of the elastomeric seal to reduce its tendency to extrude into the gap between the piston flange and cylinder wall. The patent literature has suggested other techinques to reduce extrusion. For example, U.S. Pat. No. 2,926,976 to Bowerman et al. discloses a pump sealing device with an elastomeric sealing section and an anti-extrusion ring; the elastomeric sealing section is located with one side in contact with the working fluid and is bonded to a rubber-impregnated fabric section, which serves as an anti-extrusion section; the rubber-impregnated fabric section is bonded to a base ring, which seats against the piston flange. The base ring is a rigid, nonexpandible ring that has a diameter equal to the diameter of the rubber-impregnated fabric and, thereby, serves to reduce the area available for extrusion, but does not eliminate it.

U.S. Pat. No. 3,521,893 to Josephson discloses a pump sealing device with an elastomeric sealing ring and an anti-extrusion ring where the elastomeric sealing ring has a groove at one end and an anti-extrusion ring is located in the groove but not bonded to the elastomeric sealing ring. The anti-extrusion ring has a radially outward, reduced-area portion that is forced into intimate contact with the cylinder by the hydrostatic pressure generated during operation of the pump. The size of the reduced-area portion and the material from which the anti-extrusion ring is made are selected so that the yield strength of the anti-extrusion ring is exceeded to enable the anti-extrusion ring to make intimate contact with the cylinder wall. It appears that Josephson intended for the region of the anti-extrusion ring adjacent the cylinder surface to deform plastically under the influence of the pressure of the contained fluid. This system, however, does not suggest bonding the anti-extrusion ring to the elastomeric sealing material. Because of the absence of bonding, expansion of the anti-extrusion ring is uncontrolled, leading to excessive wear when employed in mud pumps.

U.S. Pat. No. 4,281,590 to Weaver discloses a pump sealing device with an elastomeric sealing section and an anti-extrusion ring where the elastomeric sealing section is bonded to the anti-extrusion ring. The anti-extrusion ring is "L" shaped or "U" shaped. The anti-extrusion ring expands radially and elastically under the influence of the hydrostatic pressure generated during operation of the pump to make intimate contact with the cylinder. This patent suggests that plastic anti-extrusion rings be used.

Both plastic and metal anti-extrusion rings are suggested by the prior art. Plastic anti-extrusion rings do not cause as much wear on the cylinder as metal anti-extrusion rings. However, if a plastic anti-extrusion ring is used in a mud pump, which operates at high pressures and high temperatures, the plastic will be relatively subject to extrusion. Consequently, the seal wear problem has not been eliminated by the use of plastic anti-extrusion rings in mud pumps since both the plastic anti-extrusion ring and the elastomeric sealing section extrude.

If a split metal anti-extrusion ring which is not bonded to the elastomeric seal is used in a mud pump, the ring will expand radially, and independently of the elastomeric sealing material, in response to hydrostatic pressure transmitted by the seal. This will force the ring against the cylinder wall with a large force per unit area by the action of the hydrostatic pressure in the working fluid. As a result, both the ring and the cylinder will wear very quickly because of the large abrasion forces that arise due to the tight metal-to-metal contact, which is caused by the high pressures, and the abrasive fluids encountered in mud pump operations.

SUMMARY OF THE INVENTION

The present invention is a sealing device having an elastomeric sealing section and an anti-extrusion ring for use in a reciprocating pump, such as a mud pump for pumping drilling mud. The sealing device is adapted to be replaceably mounted on the piston flange which moves axially back and forth within the pump cylinder.

The elastomeric sealing portion of the present invention follows conventional technology. Typically, it is a heavy section, of about equal length and diameter, of an elastomer, such as rubber or plastic, designed to respond to hydrostatic pressure against its face by expanding radially to seal against the cylinder wall. Normally, it has a slightly flared shape at the high pressure end so that the diameter at the face is slightly larger than the cylinder diameter to insure good sealing, and it may be reinforced with appropriate fabric, particularly at the heel end, which seats against the piston flange.

The anti-extrusion ring in the sealing device of the present invention is a ring of a high tensile strength and elastic modulus, which is located so that it seats against the piston flange, and is permanently bonded to the heel of the elastomeric section. The ring is made of a material typically having a modulus of elasticity of 10,000,000 psi or higher and has such a size and shape as to assure that the anti-extrusion ring will not extrude into the gap between the piston flange and the cylinder wall under the influence of the hydrostatic pressure of the working fluid in the pump. In order to assure that the ring will expand radially with expansion of the elastomeric seal and close the gap between the piston flange and the cylinder wall, the ring is designed with one or more step splits or as a series of segments, so that while resistant to axial deformation, it will have little or no resistance to expansion in the radial direction. The degree to which the anti-extrusion ring expands radially in response to the hydrostatic pressure of the working fluid is controlled by the expansion of the elastomeric heel section to which it is bonded.

A nonsplit ring of a metal, such as steel or bronze, having a modulus of elasticity well over 10,000,000 psi would normally be resistant to radial expansion at the working pressure of a typical mud pump, which is about 2,000 to 4,000 psi. To cause a nonsplit ring of metal such as bronze or steel to expand by 1/32th of an inch in a $4\frac{1}{2}''$ cylinder, a hydrostatic pressure of over 200,000 psi would be required. At the working pressure in a typical mud pump where wear has created a 1/32" gap between the anti-extrusion ring and the cylinder wall, the gap would not be filled by expansion of such a ring. However, the elastomeric seal would expand to fill the gap, and it would also extrude into the gap between the ring and the cylinder wall. This creates the problem of excessive wear which the anti-extrusion ring was supposedly intended to avoid.

As explained above, in the present invention the anti-extrusion ring is split or segmented and bonded to the elastomeric sealing material, so that it will expand radially with the expansion of the elastomeric seal as wear occurs. However, because the anti-extrusion ring is bonded to the elastomeric material, the elastomer absorbs a significant portion of the hydrostatic pressure from the drilling mud. This limits the pressure exerted radially by the anti-extrusion ring on the cylinder liner and materially extends the life of the ring and seal assembly.

In some embodiments the split anti-extrusion ring of the present invention can be slightly larger in its relaxed condition than the diameters of the heel of the elastomeric section and cylinder within which it fits. In use, therefore, the sealing ring maintains positive contact between the ring and the cylinder wall, even under no load conditions, and tends to keep the heel of the elastomeric sealing section from extruding into even a miminal gap which may exist between the anti-extrusion ring and cylinder wall.

BRIEF DESCRIPTION OF THE DRAWINGS

The objects and advantages of the present invention may be better understood by reference to the following description of exemplary embodiments thereof, taken in conjunction with the accompanying drawings in which.

DETAILED DESCRIPTION OF THE PREFERRED EMBODIMENTS

Figure 1:
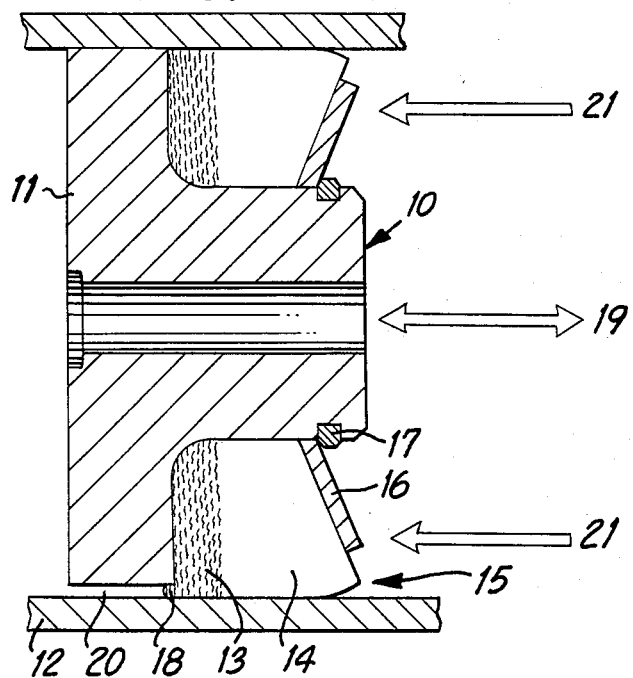
FIG. 1 is a sectional view of a prior art sealing device arranged on a piston in a cylinder.

In the figures, like reference numerals indicate like elements.

FIG. 1 shows a typical prior-art mud pump piston 10 and a pump sealing device or seal 15 therefor. The piston 10 has a flange 11. The seal 15 rests on the piston flange. The seal is comprised of an elastomeric sealing section 14 and a heel section 13. These sections are bonded together. The heel section 13 is typically made from a stack of several layers of rubber-impregnated fabric to give it a higher modulus of elasticity than the elastomeric sealing section. In prior art mud pumps, the heel section, which is stiffer than the elastomeric sealing section, resists extrusion into the gap between the cylinder liner and piston flange to some extent. However, the heel section is still forced into the gap under the influence of the hydrostatic pressure where wear occurs. Reference numeral 18 designates an extruded portion of the heel section that is in the gap 20 between the flange 11 and the cylinder 12.

Both the elastomeric sealing section 14 and the heel section 13 make intimate contact with the cylinder 12. The seal is held in place by the retaining ring 16 and the snap ring 17. The retaining ring and snap ring hold the seal 15 in place to permit easy replacement. Easy replacement of seals is a desirable feature for a mud pump since seals typically wear out before the other mud pump components and must be replaced in order to continue pumping operations.

The direction of travel of the piston 10 is shown by the arrow 19. The direction of the hydrostatic pressure force exerted by the working fluid of the pump is shown by the arrows 21. This force axially compresses the elastomeric sealing section 14 and the heel section 13 and radially expands these sections against the cylinder wall.

Figure 2:
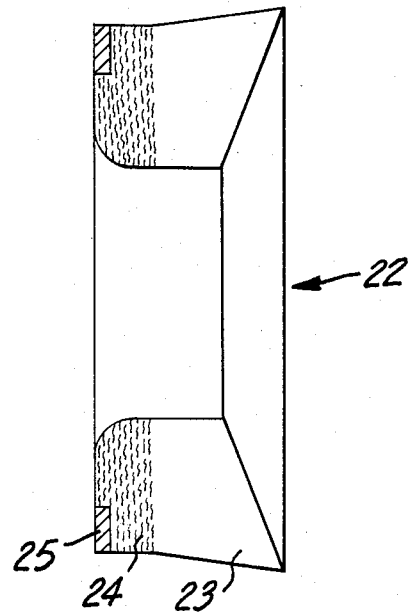
FIG. 2 is a sectional view of a sealing device in accordance with the invention.

FIG. 2 shows a seal 22 for a reciprocating pump, e.g., a mud pump, in accordance with the invention. The seal 22 includes an elastomeric sealing section 23, a heel section 24, and an anti-extrusion ring 25. The elastomeric sealing section 23 is bonded to the heel section 24, and the heel section 24 is bonded to the anti-extrusion ring 25.

The heel section 24 is made from a material that has a higher modulus of elasticity than the material for the elastomeric section 23. In most mud pump seals which are now commercially available, the heel section typically is reinforced by a fabric such as cotton duck or nylon. Alternatively, some pump seals may have a heel section made of a high modulus elastomer and plastic.

Figure 3:
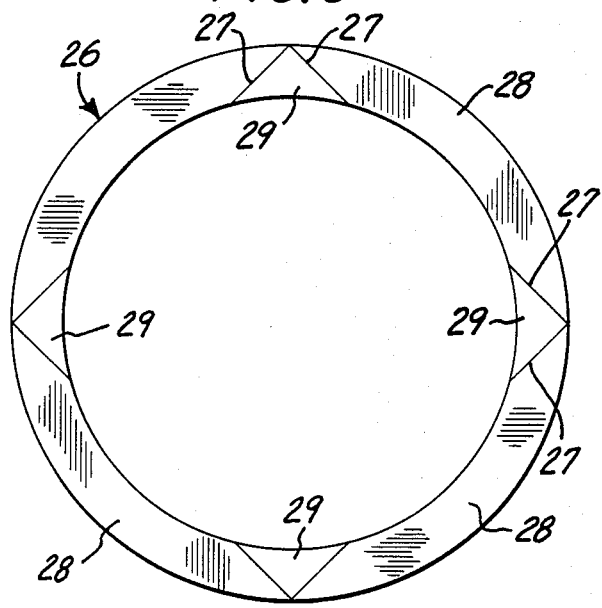
FIG. 3 is a top view of an anti-extrusion ring having tangential-cut splits.
Figure 5:
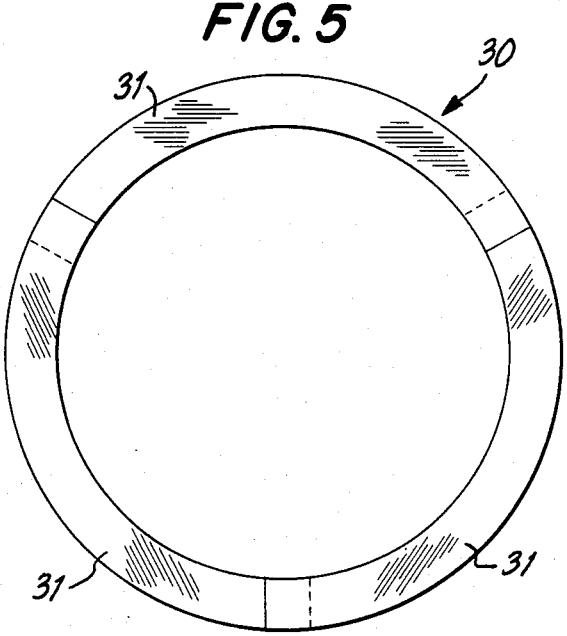
FIG. 5 is a top view of an anti-extrusion ring having step-cut splits.
Figure 4:
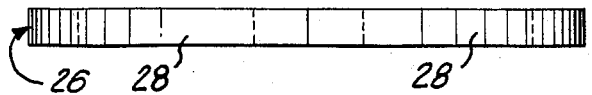
FIG. 4 is a side view of an anti-extrusion ring having tangential-cut splits.
Figure 6:
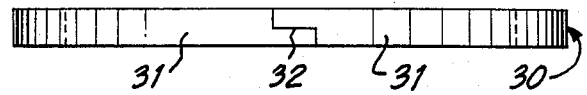
FIG. 6 is a side view of an anti-extrusion ring having step-cut splits.

The anti-extrusion ring 25 is made from a material that has a modulus of elasticity, size, and shape sufficient to prevent the ring from extruding in the axial direction into the gap between the piston flange and the cylinder. In accordance with the present invention, the anti-extrusion ring is preferably made from a metal such as steel or cast iron, or other material which has a modulus of elasticity in excess of about 10,000,000 psi. The anti-extrusion ring is provided with one or more tangential-cut splits 27 as shown in FIGS. 3 and 4 or step-cut splits 32 as shown in FIGS. 5 and 6 so that the ring has substantially no resistance to expansion radially.

The radial expansion of the anti-extrusion ring is controlled by the expansion of the heel section material to which it is bonded. The heel section must be of a material so selected relative to the pump dimensions, anticipated wear, and operating pressure of the pump, that the heel material, as well as the anti-extrusion ring that is bonded to it, will expand sufficiently to be in sliding contact with the cylinder liner and, thereby, be effective to seal the gap between the piston flange and cylinder liner. It is to be noted, however, that excessively soft materials are not desirable since, although they will impart some benefit, they will transmit too much of the working pressure to the anti-extrusion ring. As explained at the outset, the purpose of bonding the anti-extrusion ring to the elastomeric seal material is to prevent the anti-extrusion ring from expanding independently of the elastomeric seal. If it is not bonded to the elastomer, the ring will expand in response to the full force of the hydrostatic pressure transmitted through the elastomeric seal. By bonding the ring to the elastomeric seal, its expansion is controlled by the expansion of the heel section of the seal, which limits the force applied by the ring to the cylinder liner.

Ideally, the material of the heel section of the elastomeric seal which controls the expansion of the anti-extrusion ring would be so selected that, at the maximum anticipated operating pressure of the pump and the maximum anticipated wear, the expansion of the seal ring assembly would be sufficient to just "kiss" the cylinder liner. Obviously, when the cylinder and liner are new and the gap is small, the anti-extrusion ring will apply some pressure to the cylinder liner; however, that pressure will be significantly reduced from that which would be found if the expansion of the anti-extrustion ring was not controlled by the heel section of the elastomeric seal.

By way of illustration, consider the expansion of a seal and ring assembly having a heel section for a pump operating at a working pressure of 3,000 psi. The seal and ring assembly would typically be designed so that the heel section would permit the anti-extrusion ring to just touch, i.e., just "kiss," the cylinder liner after expanding 1/32th of an inch. Consequently, the heel section would have to be selected from a material having a modulus of elasticity of approximately 200,000 psi. In such a pump, after the piston and cylinder have worn so that the gap is 1/32th of an inch, the pressure exerted by the anti-extrustion ring on the cylinder liner is approximately 0 psi. However, when new, the liner-seal gap might typically be only 0.01"; and in such a case if the pump is operating at its maximum pressure, the anti-extrusion ring would exert some force on the cylinder liner even though the expansion is controlled by the heel section. For example, if the gap is 0.010 inch, the force exerted by the anti-extrusion ring on the cylinder liner would be approximately 2,000 psi. This force is significantly smaller than the force that would be exerted if no heel section was present, namely, a force of approximately 3,000 psi, the working pressure of the pump.

With the proper selection of the material for the heel section of the sealing device, any desired degree of control of the expansion of the anti-extrusion ring can be obtained. If a material with a low modulus of elasticity is selected, the anti-extrusion ring will expand more than if a material with a higher modulus of elasticity is selected.

FIGS. 3 and 4 show an example of an anti-extrusion ring 26, which is expandable, that would be used in a sealing device in accordance with the invention. The ring shown is a segmental ring having segments 28 and 29 that are defined by the tangential-cut splits 27. The angle that the tangential-cut splits make with respect to a radial line is not critical to the invention. The use of such a ring permits the segments of the ring 28 and 29 to expand and remain in close contact with each other as the outer edge of the ring wears and as the segments move radially outwardly under the influence of the hydrostatic pressure of the working fluid. Such an anti-extrusion ring is bonded to the heel section of the seal so that the heel section can control the radially outwardly directed force and prevent the ring from pressing too tightly against the cylinder.

FIGS. 5 and 6 show another example of an anti-extrusion ring 30, which is expandable, that can be used in a sealing device in accordance with the invention. The ring shown has segments 31 placed adjacent to one another and joined by the step-cut splits 32. Such a ring is similar in construction to a piston ring in an automobile. The use of such a ring permits the segments to expand and remain in close contact with each other as the outer edges wear and as the segments move radially outwardly under the influence of the hydrostatic pressure of the working fluid. Such an anti-extrusion ring is bonded to the heel section of the seal so that the heel section can control the radially outwardly directed force and prevent the ring from pressing too tightly against the cylinder.

In order to enhance the gap-closing ability of the anti-extrusion ring and to further reduce extrusion and, consequently, wear of the elastomeric sealing section, the anti-extrusion ring should be sized with its outer diameter such that an interference fit exists between the ring and the cylinder. In other words, the ring is biased so that it is in intimate, movable contact with the cylinder. This interference fit positively closes the gap and provides for an effective sealing device that substantially reduces extrusion. The anti-extrusion ring is, again, bonded to the heel section; the heel section is, again, selected from a material that will control the force on the ring in order to prevent the ring from pressing too tightly against the cylinder so that wear of the cylinder will be inhibited and so that seal life will be prolonged.

We claim:

1. In a pump sealing device for a reciprocating pump used to pump abrasive liquids, said pump having a cylinder, a piston with a flange, and a gap between the cylinder and flange, said sealing device comprising an elastomeric seal for sealing said fluid having a first face in contact with the fluid being pumped, a second face in sealing contact with the cylinder, and a heel section resting at least in part in contact against the flange; and an anti-extrusion ring;

the improvement wherein said anti-extrusion ring is expandable and bonded to the heel section of said elastomeric seal so that the expansion of said ring is controlled by the expansion of the heel section of said elastomeric seal, said ring being sized to be in intimate, movable contact with said cylinder, being located adjacent to the flange and to the heel section of the seal, having at least one split through it to allow for radial expansion of the ring, and being of a material having a modulus of elasticity of at least 10,000,000 psi and a yield strength, size and shape sufficient to prevent the ring from permanently deforming under hydrostatic pressures generated in the cylinder during pumping operations.

2. A pump sealing device according to claim 1 wherein said elastomeric seal includes two layers of elastomeric material, said first layer being disposed between said fluid and said second layer and having a lower modulus of elasticity than said second layer, said second layer being used in said heel section, and bonded to said first layer and to said anti-extrusion ring.

3. A pump sealing device according to claim 2 wherein said anti-extrusion ring has a plurality of adjacent segments defined by substantially equiangularly spaced step-cut splits to allow said segments to expand radially outwardly while remaining in close contact with adjacent segments.

4. A pump sealing device according to claim 1 wherein said anti-extrusion ring is made of a metal.

5. A pump sealing device according to claims 4 or 11 wherein said anti-extrusion ring, at least when the cylinder is new, has an outer diameter larger than an inner diameter of said cylinder and is biased to movably contact said cylinder by being compressed to fit within said cylinder.

6. A pump sealing device according to claim 5 wherein said anti-extrusion ring has at least one step-cut split.

7. A pump sealing device according to claim 5 wherein said anti-extrusion ring has at least one tangential-cut split.

* * * * *

UNITED STATES PATENT AND TRADEMARK OFFICE
CERTIFICATE OF CORRECTION

PATENT NO. : 4,516,785
DATED : May 14, 1985
INVENTOR(S) : Miller, et al

It is certified that error appears in the above-identified patent and that said Letters Patent is hereby corrected as shown below:

Col. 1, line 56, "techinques" should read --techniques--;

Col. 5, lines 44, 58 & 62, "extrustion" should read --extrusion--.

In The Claims:

Col. 8, line 9, "claims 4 or 11" should read --claim 4--.

Signed and Sealed this

Seventeenth Day of September 1985

[SEAL]

Attest:

Attesting Officer

DONALD J. QUIGG

Commissioner of Patents and
Trademarks—Designate